US005246602A

United States Patent [19]

Forrest

[11] Patent Number: 5,246,602

[45] Date of Patent: Sep. 21, 1993

[54] METHOD AND COMPOSITION FRACTURING SUBTERRANEAN FORMATIONS

[76] Inventor: Gabriel T. Forrest, 15046 Grant Rd., Cypress, Tex. 77429

[21] Appl. No.: 928,546

[22] Filed: Aug. 13, 1992

Related U.S. Application Data

[63] Continuation of Ser. No. 647,771, Jan. 30, 1991, abandoned, which is a continuation-in-part of Ser. No. 534,890, Jun. 7, 1990, abandoned, which is a continuation-in-part of Ser. No. 233,895, Aug. 15, 1988, abandoned, which is a continuation of Ser. No. 25,995, Mar. 16, 1987, abandoned, which is a continuation-in-part of Ser. No. 831,850, Feb. 24, 1986, abandoned.

[51] Int. Cl.[5] ..... E21B 43/26

[52] U.S. Cl. ..... 252/8.551; 166/283

[58] Field of Search ..... 166/283; 252/8.551

[56] References Cited

U.S. PATENT DOCUMENTS

| | | | |
|---|---|---|---|
| 2,351,434 | 6/1944 | Jessen et al. | 252/8.5 |
| 2,815,079 | 12/1957 | Goins, Jr. et al. | 166/29 |
| 2,873,250 | 2/1959 | Scott, Jr. | 252/8.5 |
| 2,943,679 | 7/1960 | Scott, Jr. et al. | 166/21 |
| 3,208,523 | 9/1965 | Coyle et al. | 166/29 |
| 3,217,801 | 11/1965 | Fast et al. | 166/42 |
| 3,245,469 | 4/1966 | Bertness | 166/39 |
| 3,364,995 | 1/1968 | Atkins et al. | 166/280 |
| 3,574,099 | 4/1971 | Ryals et al. | 252/8.5 |
| 3,629,102 | 12/1971 | Lummus et al. | 252/8.512 |
| 3,788,405 | 1/1974 | Taylor | 175/72 X |
| 3,868,998 | 3/1975 | Lybarger et al. | 166/278 |
| 3,960,736 | 6/1976 | Free et al. | 252/8.55 R |
| 4,082,677 | 4/1978 | Zollar et al. | 252/8.5 |
| 4,353,509 | 10/1982 | Bostian, Jr. | 241/24 |
| 4,387,769 | 6/1983 | Erbstoesser et al. | 166/295 |
| 4,391,925 | 7/1983 | Mintz et al. | 252/8.512 X |
| 4,397,354 | 8/1983 | Dawson et al. | 252/8.512 X |
| 4,470,915 | 9/1984 | Conway | 252/8.55 R |
| 4,503,170 | 3/1985 | Drake et al. | 252/8.51 X |
| 4,526,695 | 7/1985 | Erbstoesser et al. | 252/8.55 R |
| 4,541,485 | 9/1985 | Block | 166/281 |
| 4,559,149 | 12/1985 | Shell | 252/8.51 X |
| 4,568,392 | 2/1986 | Dawson et al. | 252/8.512 X |
| 4,715,967 | 12/1987 | Bellis et al. | 252/8.551 |
| 4,848,467 | 7/1989 | Cantu et al. | 166/281 |
| 5,004,553 | 4/1991 | House et al. | 252/8.51 |
| 5,076,944 | 12/1991 | Cowan et al. | 507/104 |
| 5,087,611 | 2/1992 | Forrest | 507/104 |

OTHER PUBLICATIONS

"Laboratory and Field Evaluation of a Combined Fluid-Loss Control Additive and Gel Breaken For Fracturing Fluids" L. Cantu and P. Boyd; SPE Paper 18211; Oct. 1988.

*Primary Examiner*—Gary Geist

*Attorney, Agent, or Firm*—Arthur F. Zobal

2 Claims, 3 Drawing Sheets

METHOD AND COMPOSITION FRACTURING SUBTERRANEAN FORMATIONS

RELATED APPLICATIONS

This is a continuation of copending U.S. application Ser. No. 07/647,771, filed Jan. 30, 1991, now abandoned, which is a continuation-in-part of U.S. patent application Ser. No. 534,890, filed Jun. 7, 1990, now abandoned which is a continuation-in-part of U.S. patent application Ser. No. 07/233,895, filed Aug. 15, 1988, now abandoned which is a continuation of U.S. patent application Ser. No. 07/025,995, filed Mar. 16, 1987, now abandoned, which is a continuation-in-part of U.S. patent application Ser. No. 06/831,850, filed Feb. 24, 1986, now abandoned.

FIELD OF THE INVENTION

The invention relates to: a process for fracturing a subterranean formation, such as an oil and/or gas producing formation; a fluid loss additive for fracture treatment fluids used to fracture subterranean formations penetrated by a well bore; and a fracture treatment fluid, used to fracture a subterranean formation.

DESCRIPTION OF THE PRIOR ART

Hydraulic fracturing of subterranean formations is a highly developed process, used primarily to increase the permeability of a portion of a geologic formation surrounding a well bore. The process may be applied to new wells to increase productivity of the wells, or to old wells to increase or restore their productivity. Hydraulic fracturing processes are also applicable to injection wells used in secondary recovery or fluid disposal operations.

In a typical fracturing process, a fracture treatment fluid, such as a thickened fluid such as an aqueous gel, emulsion, foamed fluid, gelled alcohol, or an oil based fluid, is utilized. The fracture treatment fluid increases the fracturing effect and typically also supports proppant material which is deposited in the fractures created by the fracturing process. In many cases, a fluid loss additive material is included with the fracture treatment fluid, or fracturing fluid, to further enhance the results of the process. A common fluid loss additive material is silica flour. Many other natural and synthetic solid materials have been utilized as fluid loss additives in fracturing processes, such as a mixture of clays and starches with a broad range of particle sizes. In one process, a hydrocarbon phase in percents ranging from 0.5 to 5% by volume of the fracturing fluid is added to the fracture treatment fluid. This method concentrates the hydrocarbon within a filter cake which is formed, as will be hereinafter described in greater detail, lowering the relative permeability to water through the filter cake, resulting in a lower leakoff rate of water to the formation. The mechanism for fluid loss control with a solid additive is the filtration of particles onto the porous rock surface of the formation in the form of a filter cake. The longer the fluid loss additive and fracturing fluid are pumped into the well bore and into the formation, the thicker the filter cake becomes which results in a lowering of the leakoff rate. Controlling leakoff during hydraulic fracturing is desirable in order to create greater fracture volume and to minimize damage to the surrounding formation. Additionally, it is desirable to reduce the initial spurt, or initial leakoff, before the filter cake is established.

A detailed description of the hydraulic fracturing process, including a description of conventional aqueous gels or emulsions used as a fracture treatment fluid, is set forth in U.S. Pat. No. 4,470,915, issued Sep. 11, 1984, to Michael W. Conway. When solid fluid loss additives are included in a fracture treatment fluid which include aqueous gels or emulsions, a gel filter pad comprising fluid loss additive and concentrated gel material forms on the surfaces of the well bore and the fracture is created by the process. Ideally, this gel filter pad, or gel filter cake, is subsequently removed by back flow of fluid from the formation (except in the case of injection wells), but in actual practice, it is usually necessary to follow the treatment with gel breaking and/or gel filter pad removal steps. These steps often only recover a small fraction of the potential conductivity of the fracture and the productivity of the well. The conductivity of the fracture is generally the flow capacity through the proppant material in the fracture which permits the hydrocarbons from the formation to flow into the well bore.

Accordingly, prior to the development of the present invention, there has been no fluid loss additive, fracturing process, or fracture treatment fluid, which: is less expensive to use than prior art additives, processes, and fluids; controls leakoff of fracturing fluid to permeable formations during the hydraulic fracturing process and, in particular, decreases spurting, or initial leakoff; and restores a substantial portion of the potential conductivity of the fracture and the productivity of the well by backflow of fluid from the formation, or flowback of fracturing fluid filtrate.

Therefore, the art has sought a fluid loss additive for fracture treatment fluid, a hydraulic fracturing process, and a fracture treatment fluid which: is less expensive than conventional fluid loss control additives, hydraulic fracturing processes, and fracture treatment fluids; controls leakoff of fracturing fluid to permeable formations, and in particular decreases spurting, or initial leakoff; and recovers a substantial portion of the potential conductivity of the fracture and the productivity of the well by backflow of fluid from the formation, or flowback of fracturing fluid filtrate, by degradation of the filter cake by the backflow, or flowback.

SUMMARY OF THE INVENTION

In accordance with the invention, the foregoing advantages have been achieved through the present process for fracturing a subterranean formation penetrated by a well bore wherein a fracture treatment fluid is pumped down the well bore and into the formation at formation fracturing pressure. The present invention includes the steps of: utilizing as a fluid loss additive finely ground peanut hulls, wherein 10% or more of the finely ground peanut hulls is in the particle size range of less than 20 standard sieve mesh and greater than 500 standard sieve mesh; and adding the finely ground peanut hulls to the fracture treatment fluid in an amount within the range of from 5 to 100 pounds per 1000 gallons of fracture treatment fluid. Another feature of the present invention is that the finely ground peanut hulls may be added to the fracture treatment fluid in an amount within the range of 10 to 30 pounds per 1000 gallons of fracture treatment fluid.

In accordance with the invention, the foregoing advantages have also been achieved through the present fluid loss additive for fracture treatment fluid used to fracture subterranean formations penetrated by a well bore. The present invention includes: finely ground peanut hulls, wherein 10% or more of the finely ground peanut hulls is in the particle size range of less than 20 standard sieve mesh and greater than 500 standard sieve mesh; and the finely ground peanut hulls are added to the fracture treatment fluid in an amount within the range of from 5 to 100 pounds per 1000 gallons of fracture treatment fluid. An additional feature of the invention is that the finely ground peanut hulls may be added to the fracture treatment fluid in an amount within the range of 10 to 30 pounds per 1000 gallons of fracture treatment fluid.

In accordance with the invention, the foregoing advantages have also been achieved through the present fracture treatment fluid, used to fracture a subterranean formation penetrated by a well bore, the fracture treatment fluid being pumped down the well bore and into the formation. The present invention includes: an aqueous gel or emulsion; and a fluid loss additive material which is finely ground peanut hulls, wherein 10% or more of the finely ground peanut hulls is in the particle size range of less than 20 standard sieve mesh and greater than 500 standard sieve mesh; the finely ground peanut hulls being added to the aqueous gel or emulsion in an amount within the range of from 5 to 100 pounds per 1000 gallons of aqueous gel or emulsion. Another feature of the present invention is that the finely ground peanut hulls may be added to the aqueous gel or emulsion in an amount within the range of 10 to 30 pounds per 1000 gallons of aqueous gel or emulsion.

In accordance with the invention, the foregoing advantages have also been achieved through the present fracture treatment fluid, used to fracture a subterranean formation penetrated by a well bore, the fracture treatment fluid being pumped down the well bore and into the formation. The present invention includes an oil based fluid; and a fluid loss additive material which is finely ground peanut hulls, wherein 10% or more of the finely ground peanut hulls in the particle size range of less than 20 standard sieve mesh and greater than 500 standard sieve mesh; the finely ground peanut hulls being added to the oil based fluid in an amount within the range of from 5 to 100 pounds per 1000 gallons of oil based fluid.

The hydraulic fracturing process, fluid loss additive, and fracture treatment fluid of the present invention, when compared with previously proposed prior art fluid loss additives, fracture treatment fluids, and hydraulic fracturing processes, have the advantages of: being less expensive to use; controlling leakoff of the fracturing fluid to permeable formations, including in particular, decreasing spurting, or initial leakoff; and recovering a major portion of the potential conductivity of the fracture and the productivity of the well by the fluid loss additive degrading with flowback of fracturing fluid filtrate, or backflow of fluid from the formation.

Figure 1:
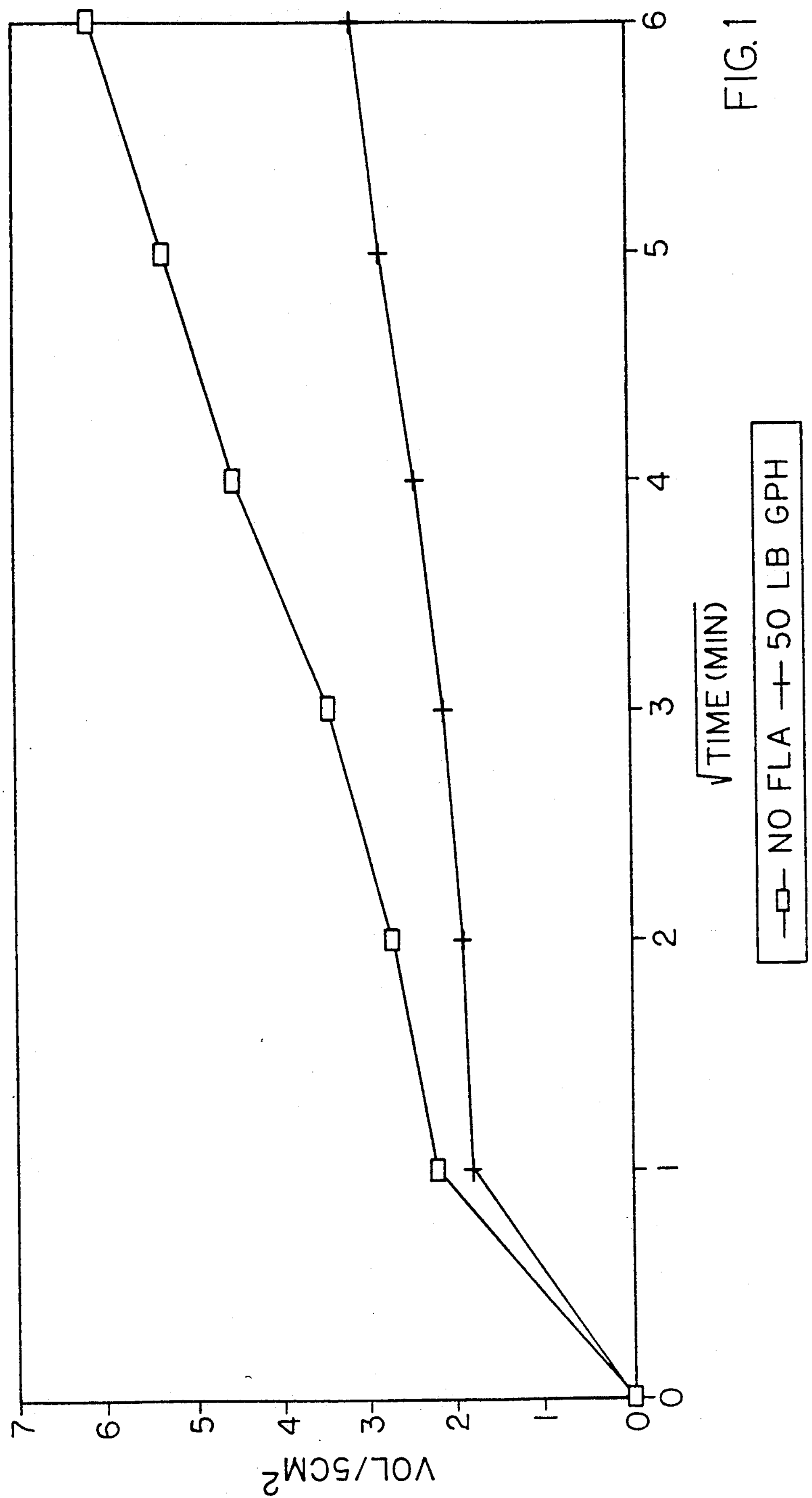
FIG. 1 is a chart illustrating a fluid leakoff test comparing fluid leakoff of a fracture treatment fluid with, and without, the fluid loss additive of the present invention.

The invention will be described in connection with the preferred embodiment, and it will be understood that it is not intended to limit the invention to that embodiment. On the contrary, it is intended to cover all alternatives, modifications, and equivalents as may be included within the spirit and scope of the invention and defined by the appended claims.

DETAILED DESCRIPTION OF THE INVENTION

The fluid loss additive of the present invention for fracture treatment fluids used for fracturing subterranean formations penetrated by a well bore is preferably the soft portion of a legume—peanut hulls. Raw, unground peanut hulls are finely ground and are added to a conventional fracture treatment fluid, as will hereinafter be described in greater detail. Preferably, the raw peanut hulls are fully ground into a powder, or powder-like consistency. The raw peanut hulls are ground, in any conventional manner, to a particle size range of less than 20 standard sieve mesh and greater than 500 standard sieve mesh. When raw peanut hulls are ground into the foregoing particle size range, a layer of natural lignin is exposed. Laboratory tests have determined that the typical composition of peanut hulls is 35% to 45% cellulose and 27% to 33% lignin. Chemical analysis of peanut hulls indicate that they have the following composition: 8% to 10% moisture; 6% to 7% crude protein; 1% fat; 35% to 45% cellulose; 27% to 33% lignin; and 3% to 4% ash. In the preferred particle size range, a natural layer of lignin is exposed which lowers the water solubility of the fluid loss additive such that it slowly swells. As will be hereinafter described in greater detail, this controlled swelling action aids in minimizing leakoff as the fluid loss additive is deposited within the filter cake and further allows the fluid loss additive material, or finely ground peanut hulls, to clean up upon flowing back the treated well.

Preferably, the fluid loss additive of the present invention is comprised of finely ground peanut hulls in the foregoing described particle size range, and at least 10% or more of the finely ground peanut hulls fall within the foregoing particle size range. It is believed that use of some finely ground peanut hulls of a size less than 500 standard sieve mesh will not detract from the effectiveness of the fluid loss additive of the present invention; however, cost considerations in grinding peanut hulls to that size, at the present time, suggest the preferred lower end of the particle size range, for the majority of the ground peanut hulls, being greater than 500 standard sieve mesh. At the present time, it is believed that use of finely ground peanut hulls, wherein more than 10% of the particle size range is larger than 20 standard sieve mesh, would reduce the effectiveness of the fluid loss additive, since the lignin layer of the peanut hulls would likely not be sufficiently exposed.

The fluid loss additive of the present invention should be added to the fracture treatment fluid in an amount within the range of from 5 to 100 pounds per 1000 gallons of fracture treatment fluid. Preferably, the fluid loss additive, or finely ground peanut hulls of the present invention, are added to the fracture treatment fluid in an amount within the range of 10 to 50 pounds per 1000 gallons of fracture treatment fluid. Adding the finely ground peanut hulls to the fracture treatment fluid in an amount within the range of 10 to 30 pounds per 1000 gallons of treating fluid has been found to be effective and adequate. The fluid loss additive may be added to the fracture treatment fluid in any conventional manner, as by: mixing the fluid loss additive with the fracture treatment fluid in any suitable mixer device; combining and compacting the fluid loss additive with a soluble binder into pellets which can then be added to, or mixed with, the fracture treatment fluid; or combining the fluid loss additive with any suitable fluid, which can then be added to, or mixed with, the fracture treatment fluid.

With respect to the foregoing described particle size range for the finely ground peanut hulls, if 100 pounds of finely ground peanut hulls are added to 1000 gallons of fracture treatment fluid, 10% of the finely ground peanut hulls, falling within the particle size range of less than 20 standard sieve mesh and greater than 500 standard sieve mesh, would suffice to permit the fluid loss additive to function in its desired manner. Conversely, if only 10 pounds of finely ground peanut hulls are added to 1000 gallons of fracture treatment fluid, at least 90% of the finely ground peanut hulls should be within a particle size range of less than 20 standard sieve mesh and greater than 500 standard sieve mesh.

As to the fracture treatment fluid which may be used in connection with the fluid loss additive of the present invention, it is believed that the fluid loss additive of the present invention will work with any presently known, conventional fracture treatment fluid, such as aqueous gel or emulsion type fracture type treatment fluids, such as those described in U.S. Pat. No. 4,470,915 or as described in U.S. Pat. No. 4,848,467, issued Jul. 18, 1989, to Lisa A. Cantu, et al. The aqueous gel can be produced by gelling agents recited in those patents, or any other conventional gelling agents. The aqueous fluid used to solvate the gelling agent may be water or a water-alcohol solution. Conventional gelled alcohol fracture treatment fluids, as well as emulsion type fracture treatment fluids may be used in connection with the fracturing process of the present invention, in connection with the fluid loss additive of the present invention, or in the fracture treatment fluid of the present invention. Likewise, conventional oil based fracture treatment fluids may also be utilized. Oil based fracture treatment fluids also include conventional oil-containing fracture treatment fluids. Accordingly, use of the term of "fracture treatment fluid" throughout this specification and claims is intended to encompass all of the foregoing types of fracture treatment fluids.

The process of the present invention for fracturing a subterranean formation penetrated by a well bore wherein a fracture treatment fluid is pumped down the well bore and into the formation, at formation fracturing pressure, includes the steps of: utilizing as a fluid loss additive the finely ground peanut hulls, as previously described; and adding the finely ground peanut hulls to the fracture treatment fluid in an amount within the range of from 5 to 100 pounds per 1000 gallons of fracture treatment fluid. The fracture treatment fluid of the present invention, used to fracture a subterranean formation penetrated by a well bore, the fracture treatment fluid being pumped down the well bore and into the formation, preferably comprises an aqueous gel, emulsion, or oil based fluid; and a fluid loss additive material which is finely ground peanut hulls within the foregoing described particle size range; the finely ground peanut hulls being added to the aqueous gel, emulsion, or oil based fluid in an amount within the range of from 5 to 100 pounds per 1000 gallons of aqueous gel, emulsion, or oil based fluid. The fluid loss additive material may be added to the aqueous gel, emulsion, or oil based fluid in any manner as previously described.

With reference to FIG. 1, the improved leakoff of the fluid loss additive, fracture treatment fluid, and fracturing process of the present invention are illustrated. The equipment used for the evaluation of fluid leakoff included a high pressure Baroid test cell modified to accept 1 inch long by 1 inch diameter core plugs. In the evaluation, the core plugs are cut and saturated in 2% potassium chloride (KCl), a standard salt added to 95% of fracture treatment fluids. The core plugs were then mounted in the core holder and placed in the test cell containing the test fracture treatment fluid. In the test illustrated in FIG. 1 the fracture treatment fluid comprised 35 pounds of guar and 1.2 pounds of borate, a salt or ester of boric acid. Borates which could be utilized are sodium tetraborate, boric acid, organic esters of borate, or boric acid and sodium tetraborate, or mixtures thereof. The fluid was heated to a temperature of 125° F. to simulate a cool down temperature of a treated formation. The pressure was increased to 1000 psi differential to simulate the typical difference between a treating pressure and the bottom-hole pressure in a fracturing treatment. Once at the desired temperature, the bottom valve of the cell was opened and the volume versus time was measured. In the chart of FIG. 1, the volume is plotted versus the square root of time for the foregoing described fluid with, and without, the fluid loss additive (FLA) of the present invention, 50 pounds of finely ground peanut hulls (GPH) being utilized in one of the illustrated tests. The fluid shows an initial spurt, while the filter cake is established, in a medium to high permeability formation [7-10 millidarcies (md)]. The spurt in the example illustrated in FIG. 1 was calculated to be 0.02 $GAL/FT^2$. Thereafter the leakoff was controlled by the permeability of the formed filter cake. Leakoff in this mode is characterized by the term leakoff efficient (Cw) in $FT/\sqrt{MIN}$. In this example the Cw was 0.0020 $FT/\sqrt{MIN}$. This compared with a spurt of 0.07 $GAL/FT^2$ and a Cw of 0.0032 $FT/\sqrt{MIN}$ for the same fluid without the fluid loss additive of the present invention, through a 10 md Bandera core.

Additional data is hereinafter set forth in Table 1 to illustrate leakoff coefficients determined for prior art fluid loss additives, such as silica flour, no fluid loss additive, and 50 pounds of the fluid loss additive, or finely ground peanut hulls (GPH), of the present invention, the specified fluid loss additive being added per 1000 gallons of fluid. The gelled fluid was 35 pounds of guar and 1.2 pounds of borate, as previously described in connection with FIG. 1, or 40 pounds of another gelled fluid, hydroxypropylguar (HPG). It should be noted in the following table that the calculated spurt for the fluid loss additive of the present invention is markedly better than that obtained with the prior art fluid loss additive, silica flour, or no fluid loss additive. Normally, a particular fluid loss additive reaches a leakoff coefficient and that leakoff coefficient remains substantially stable. In connection with the present invention, it has been found that 50 pounds of the fluid loss additive of the present invention, finely ground peanut hulls, provides a leakoff coefficient that actually decreases more than expected with time, which is believed to be due to the inherent swelling action of the finely ground peanut hulls.

TABLE 1

Fluid Leakoff with Linear and Crosslinked Gels With Various Fluid Loss Additives

| Gelled Fluid | Fluid Loss Additive (lb/Mgal) | Permeability (md) | Spurt (gal/ft²) | Cw (ft/$\sqrt{\text{min}}$) |
|---|---|---|---|---|
| 40 lb HPG | None | 5-10 | 0.090 | 0.0022 |
| 40 lb HPG | 50 lb GPH | 5-10 | 0.018 | 0.0015 |
| 40 lb HPG | 50 lb Silica Flour | 5-10 | 0.050 | 0.0018 |
| 35 lb Guar + Borate | None | 5-10 | 0.070 | 0.0032 |
| 35 lb Guar + Borate | 50 lb GPH | 5-10 | 0.020 | 0.0020 |
| 35 lb Guar | 50 lb Silica Flour | 5-10 | 0.058 | 0.0014 |

Figure 2:
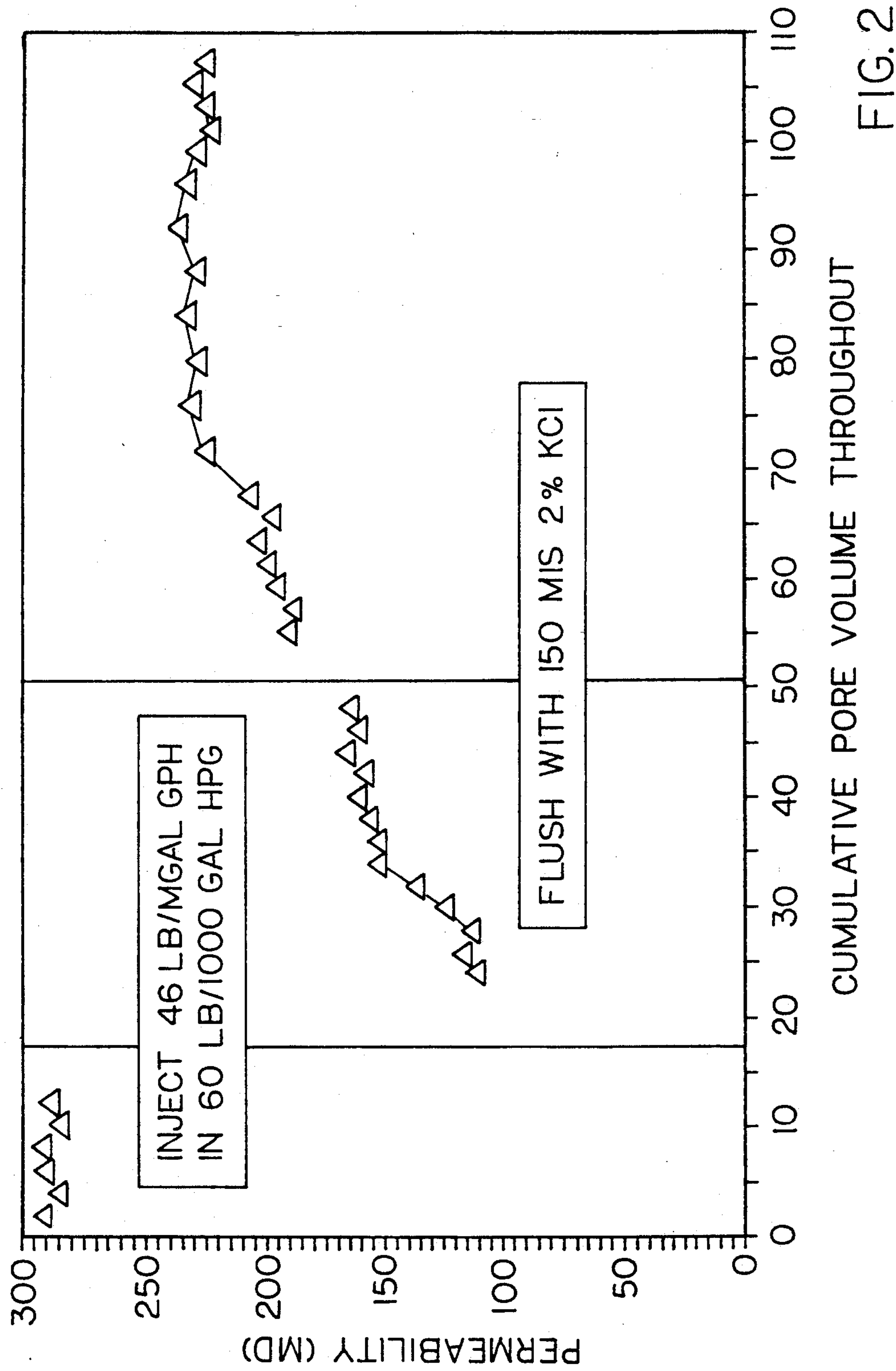
FIG. 2 is a chart illustrating the ability of the fluid loss additive, in accordance with the present invention, being capable of being removed by backflow of fluid from the formation.

With respect to FIG. 2, the ability of the fluid loss additive of the present invention to clean up off of the rock faces of a fracture with 2% potassium chloride (KC1) flowing back through the formation as illustrated. A core of near 280 md was chosen to maximize fluid, or polymer, and fluid loss additive invasion of the formation. Normally after injecting a solution of HPG and silica flour into a high permeability core, less than 10% of the original permeability is regained. With 46 pounds of finely ground peanut hulls per 1000 gallons of fracture treatment fluid being injected into the high permeability core, the fracture treatment fluid and fluid loss additive cleaned up rapidly to 225 md or nearly 80% of the initial permeability, after flowing 2% KCl back through the formation, or core.

Figure 3:
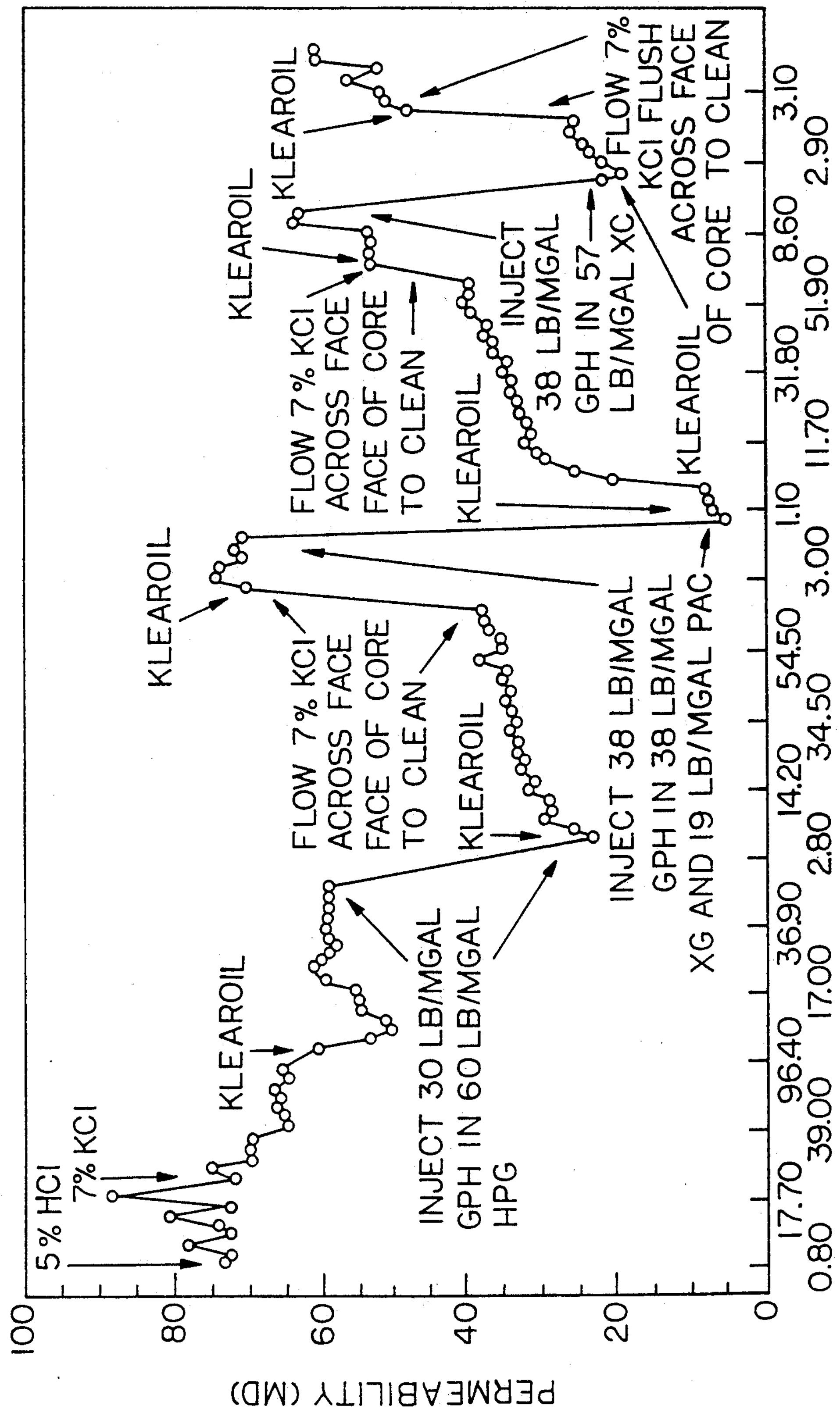
FIG. 3 is a chart illustrating the ability of the fluid loss additive of the present invention to be removed off the face of a rock surface when filter cake would normally impair conductivity of the fracture.

With respect to FIG. 3, the ability of the fluid loss additive of the present invention to clean up off the face of a rock surface where filter cake would normally impair conductivity is illustrated. FIG. 3 illustrates an experiment wherein a 75 md core was treated with 7% KCl followed by an application of KLEAROIL®. The permeability to the oil was established at 60 md. After injecting the fluid loss additive of the present invention (GPH) into the core, the oil permeability was near 40 md. By simply flowing 2% KCl water pass the core face, the oil permeability returned to 60-70 md which was 100% of the available oil permeability. The test was repeated in this sequence by reinjecting fluids containing the fluid loss additive of the present invention (GPH) at a higher level and with different polymers, namely gum Xanthan® gum (XG) and polyanionic/cellulose (PAC). Again, a post flush of 7% KC1, simulating the flow of fracturing fluid filtrate pass the rock face, returned the oil permeability to 100% of its original value.

The exact amount of fluid loss additive used in a particular fracturing treatment will depend on factors such as formation type, permeability, and temperature; however, adequate amounts of fluid loss additive, as previously described, must be used so that it becomes an integral part of the filter cake to provide leakoff control and cleanup.

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

I claim:

1. In a process for fracturing a subterranean formation penetrated by a well bore wherein a fracture treatment fluid is pumped down the well bore and into the formation at formation fracturing pressure, the improvement comprising:

utilizing as a fluid loss additive finely ground peanut hulls, wherein 10% or more of the finely ground peanut hulls is in the particle size range of less than 20 standard sieve mesh and greater than 500 standard sieve mesh; and adding the finely ground peanut hulls to the fracture treatment fluid in an amount within the range of from 5 to 100 pounds per 1000 gallons of fracture treatment fluid.

2. The process of claim 1, wherein the finely ground peanut hulls are added to the fracture treatment fluid in an amount within the range of 10 to 30 pounds per 1000 gallons of fracture treatment fluid.

* * * * *